(12) United States Patent
Cunha

(10) Patent No.: US 6,890,154 B2
(45) Date of Patent: May 10, 2005

(54) MICROCIRCUIT COOLING FOR A TURBINE BLADE

(75) Inventor: Frank J. Cunha, Avon, CT (US)

(73) Assignee: United Technologies Corporation, Hartford, CT (US)

(*) Notice: Subject to any disclaimer, the term of this patent is extended or adjusted under 35 U.S.C. 154(b) by 3 days.

(21) Appl. No.: 10/637,448

(22) Filed: Aug. 8, 2003

(65) Prior Publication Data
US 2005/0031451 A1 Feb. 10, 2005

(51) Int. Cl.[7] ................................................ F01D 5/18
(52) U.S. Cl. ................................... 416/97 R; 415/115
(58) Field of Search ......................... 415/115; 416/97 R, 416/96 R, 95

(56) References Cited

U.S. PATENT DOCUMENTS 5,797,726 A * 8/1998 Lee ............................ 416/97 R
6,247,896 B1   6/2001 Auxier et al. ............... 416/97 R
6,280,140 B1   8/2001 Soechting et al. .......... 416/97 R
6,402,470 B1 * 6/2002 Kvasnak et al. ............ 416/97 R
6,514,042 B2   2/2003 Kvasnak et al. ............ 416/97 R
6,554,571 B1 * 4/2003 Lee et al. ................... 416/97 R

* cited by examiner

Primary Examiner—Edward K. Look
Assistant Examiner—Richard A Edgar
(74) Attorney, Agent, or Firm—Linda A. P. Cunha (57) ABSTRACT

A turbine blade is provided comprising an internal cavity into which cooling air is flowable, an external wall and a first, second and third cooling circuits embedded with the wall. The cooling circuits include inlets that connect each respective cooling circuit with a cavity to provide a cooling air flow path into the respective cooling circuit. The cooling circuits also include an exit aperture that provides a cooling air flow path out of the respective cooling circuits. The cooling circuits are configured to increase the temperature of the cooling air as it travels from the inlet to the exit aperture. In the exemplary embodiment, the inlets are aligned with the direction of counter-rotating flow circulations experienced by the inner surface of the wall caused by Coriolis flow effects on the cooling air flowing inside the cavity.

22 Claims, 6 Drawing Sheets

MICROCIRCUIT COOLING FOR A TURBINE BLADE

The government may have rights in this invention, pursuant to Contract Number F33615-02-C-2202, awarded by the United States Air Force, Wright Patterson Air Force Base.

BACKGROUND OF THE INVENTION

This invention relates to gas turbines engines in general, and to an improved cooling scheme for airfoils.

Efficiency is a primary concern in the design of any gas turbine engine. Historically, one of the principle techniques for increasing efficiency has been to increase the gas path temperatures within the engine. Using internally cooled components made from high temperature capacity alloys has accommodated the increased temperatures. Turbine stator vanes and blades, for example, are typically cooled using compressor air worked to a higher pressure, but still at a lower temperature than that of the core gas flow passing by the blade or the vane. It will be understood that compressor bleed air for such cooling will be unavailable to support combustion in the combustor. The higher pressure provides the energy necessary to push the air through the component. A significant percentage of the work imparted to the air bled from the compressor, however, is lost during the cooling process. The lost work does not add to the thrust of the engine and negatively effects the overall efficiency of the engine. A person of skill in the art will recognize therefore, that there is a tension between the efficiency gained from higher core gas path temperatures and the concomitant need to cool turbine components and the efficiency lost from bleeding air to perform that cooling. There is, accordingly, great value in maximizing the cooling efficiency of whatever cooling air is used. Thus, to minimize any sacrifice in engine performance due to unavailability of cooling airflow to support combustion, any scheme for cooling blades and vanes must optimize the utilization of compressor bleed cooling air.

Figure 13:
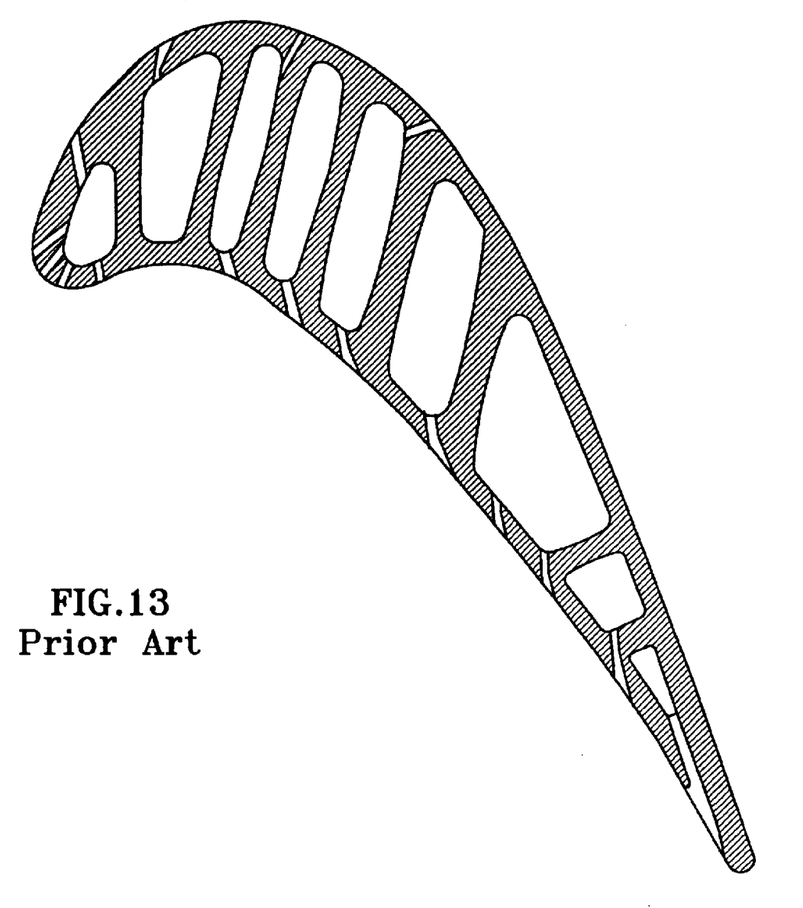
FIG. 13 is a prior art conventionally cooled airfoil.

Prior art coolable airfoils, as shown in FIG. 13, typically include a plurality of internal cavities, which are supplied with cooling air. The cooling air passes through the wall of the airfoil (or the platform) and transfers thermal energy away from the airfoil in the process. The manner in which the cooling air passes through the airfoil wail is critical to the efficiency of the process. In some instances, cooling air is passed through straight or diffused cooling apertures to convectively cool the wall and establish an external film of cooling air. A minimal pressure drop is typically required across these cooling apertures to minimize the amount of cooling air that is immediately lost to the free-stream hot core gas passing by the airfoil. The minimal pressure drop is usually produced through a plurality of cavities within the airfoil connected by a plurality of metering holes. Too small a pressure drop across the airfoil wall can result in undesirable hot core gas in-flow. In all cases, the minimal dwell time in the cooling aperture as well as the size of the cooling aperture makes this type of convective cooling relatively inefficient.

One cause of ineffective cooling can be found in poor film characteristics in those applications utilizing a cooling air film to cool a wall. However, in many cases, it is desirable to establish film cooling along a wall surface. A film of cooling air traveling along the surface of the wall increases the uniformity of the cooling and insulates the wall from the passing hot core gas. A person of skill in the art will recognize, however, that film cooling is difficult to establish and maintain in the turbulent environment of a gas turbine. In most cases, air for film cooling is bled out of cooling apertures extending through the wall. The term "bled" reflects the small difference in pressure motivating the cooling air out of the internal cavity of the airfoil. One of the problems associated with using apertures to establish a cooling air film is the film's sensitivity to pressure difference across the apertures. Too great a pressure difference across an aperture will cause the air to jet out into the passing core gas rather than aid in the formation of a film of cooling air. Too small a pressure difference will result in negligible cooling airflow through the aperture, or worse, an in-flow of hot core gas. Both cases adversely affect film cooling effectiveness. Another problem associated with using apertures to establish film cooling is that cooling air is dispensed from discrete points, rather than along a continuous line. The gaps between the apertures, and areas immediately downstream of those gaps, are exposed to less cooling air than are the apertures and the spaces immediately downstream of the apertures, and are therefore more susceptible to thermal degradation.

Turbine engine blade designers and engineers are constantly striving to develop more efficient ways of cooling airfoils to prolong life of the airfoils and reduce engine operating cost. Cooling air used to accomplish this is expensive in terms of overall fuel consumption. Thus, more effective and efficient use of available cooling air in carrying out cooling of turbine airfoils is desirable not only to prolong turbine blade life but also to improve the efficiency of the engine as well, thereby again lowering engine operating cost. Consequently, there is a continuing need in the art for a cooling design that will make more effective and efficient use of available cooling air and in particular, to increase the rotor inlet temperature or decrease the cooling flow required for the same rotor inlet temperature. There is also a need in the art to facilitate entry into the new and improved cooling designs of the cooling air required to transfer heat out of the blade.

SUMMARY OF INVENTION

The present invention provides a microcircuit cooling system that employs a new and effective approach to cool a wall exposed to a high temperature environment that requires cooling. In the exemplary embodiment, the wall cooled is in a gas turbine engine and more particularly the wall is an airfoil wall. In particular, the present invention provides an advantage over the prior art cooling schemes in that, to achieve the same metal temperature at the wall surface, less cool compressor air is required. Less compressor bleed flow results in the additional advantage of providing an increase in turbine efficiency.

Briefly, a turbine blade is provided comprising an internal cavity into which cooling air is flowable, an external wall and a first, second and third cooling circuits embedded with the wall. The cooling circuits include inlets that connect each respective cooling circuit with cavity to provide a cooling air flow path into the respective cooling circuit. The cooling circuits also include an exit aperture that provides a cooling air flow path out of the respective cooling circuits. The cooling circuits are configured to increase the temperature of the cooling air as it travels from the inlet to the exit aperture. In the exemplary embodiment, the inlets are aligned with the direction of counter-rotating flow circulations experienced by the inner surface of the wall caused by Coriolis forces on the cooling air flowing inside the cavity.

A method embodiment of the present invention is provided for placing the inlets of cooling within a wall of a turbine blade having an internal cavity into which cooling air is flowable from an end of the cavity that is in flow communication with the inlets. The method includes determining the flow direction of the cooling air within the cavity, taking into account Coriolis flow effects in the cooling air caused by rotation of the turbine blade and placing the inlets aligned with the direction of counter-rotating flow circulations experienced by the inner surface of the wall caused by Coriolis forces on the cooling air flowing inside the cavity.

BRIEF DESCRIPTION OF THE DRAWINGS

The present invention will now be described, by way of example, with reference to the accompanying drawings in which.

DETAILED DESCRIPTION OF THE INVENTION

Figure 1:
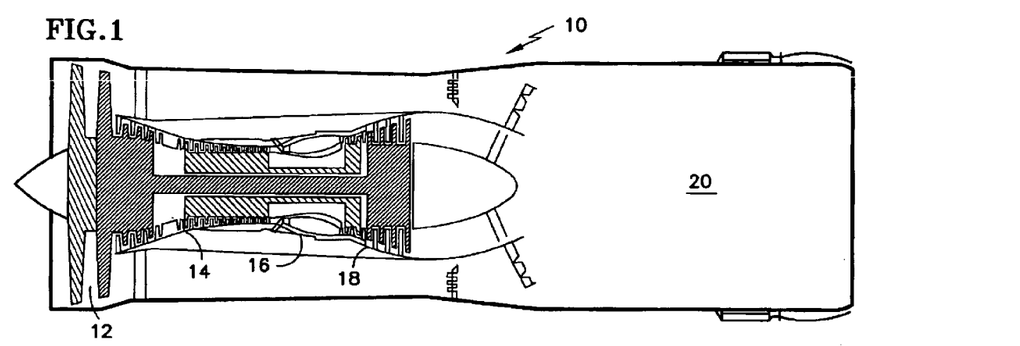
FIG. 1 is a simplified cross-sectional view of a gas turbine engine.

Referring to FIG. 1, a gas turbine engine 10 includes a fan 12, a compressor 14, a combustor 16, a turbine 18 and a nozzle 20. In and aft of the combustor 16, most components exposed to core gas are cooled because of the extreme high temperature of the core gas. The initial rotor stages and stator vane stages within the turbine 18, for example, are cooled using cooling air bled off the compressor 14 at a pressure higher and temperature lower than the core gas passing through the turbine 18. The use of the system of FIG. 1 is for illustrative purposes only and is not a limitation of the instant invention which may be employed on gas turbines used for electrical power generation and aircraft.

Figure 2:
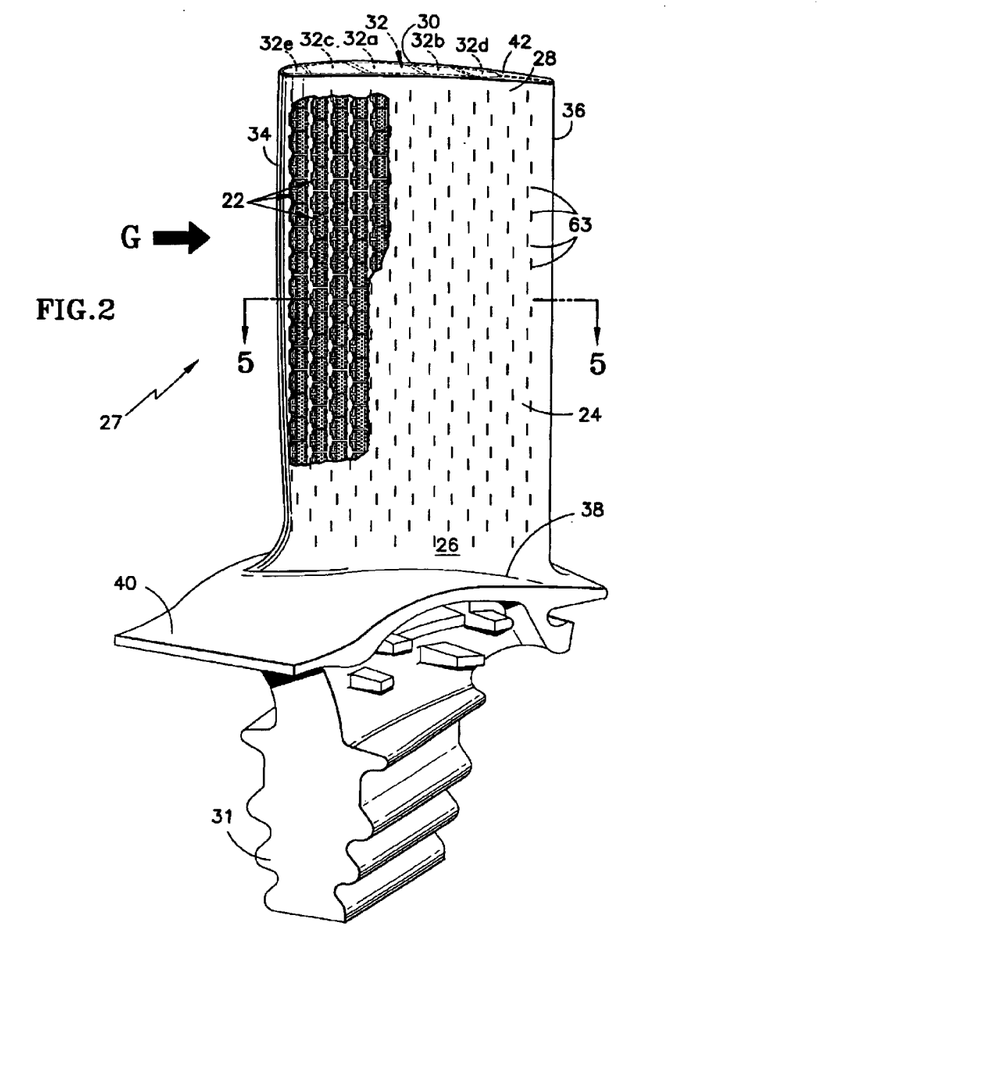
FIG. 2 is a diagrammatic view of a turbine blade that includes an airfoil showing a plurality of the present invention microcircuits disposed in a wall of the airfoil.

Referring to FIG. 2, a diagrammatic view of a turbine blade 27 having an airfoil 26 that includes a plurality of the present invention microcircuits (cooling circuits) 22 disposed in a wall 24 of the airfoil 26 is shown. The blade 27 is cast with an internal cavity (cavity) 32 located within the airfoil 26. The blade 27 is disposed radially above a fir tree 31 and having a pressure sidewall 28 and a suction sidewall 30. The sidewalls 28, 30 are joined together at axially opposite leading and trailing edges 34, 36, respectively, and extend longitudinally or radially from a root 38 where the airfoil 26 meets an integral platform 40 to a tip 42 that encloses the airfoil 26. The internal cavity 32 may be of any conventional form, multi-pass serpentine channels, with cooling air typically being a portion of the air bled from the compressor 14 (FIG. 1) of the engine 10 (FIG. 1). Preferably, the airfoil 26 has a plurality of internal passages (passages) 32a–e. The passages 32a–e are longitudinally disposed with adjacent passages interconnected to define at least a portion of a serpentine cooling circuit. It can be noted that each of the passages 32a–e has a unique cross section, although the cross section of such cooling passages may have any shape.

For purposes of giving a detailed example, the present invention microcircuit 22 will be described herein as being disposed within the wall 24 exposed to core gas flow, G, on one side and cooling air on the other side, such as in the airfoil 26 of the turbine blade 27 shown in FIG. 2. In this way, the microcircuits 22 transfer thermal energy from the wall 24 to the cooling air (air). The present invention microcircuits 22 however are not limited to turbine blades and can be used in other walls (e.g., combustors and combustor liners, augmentor liners, nozzles, platforms, blade seals, vanes, rotor blades, etc.) exposed to a high temperature environment that requires cooling.

Figure 3:
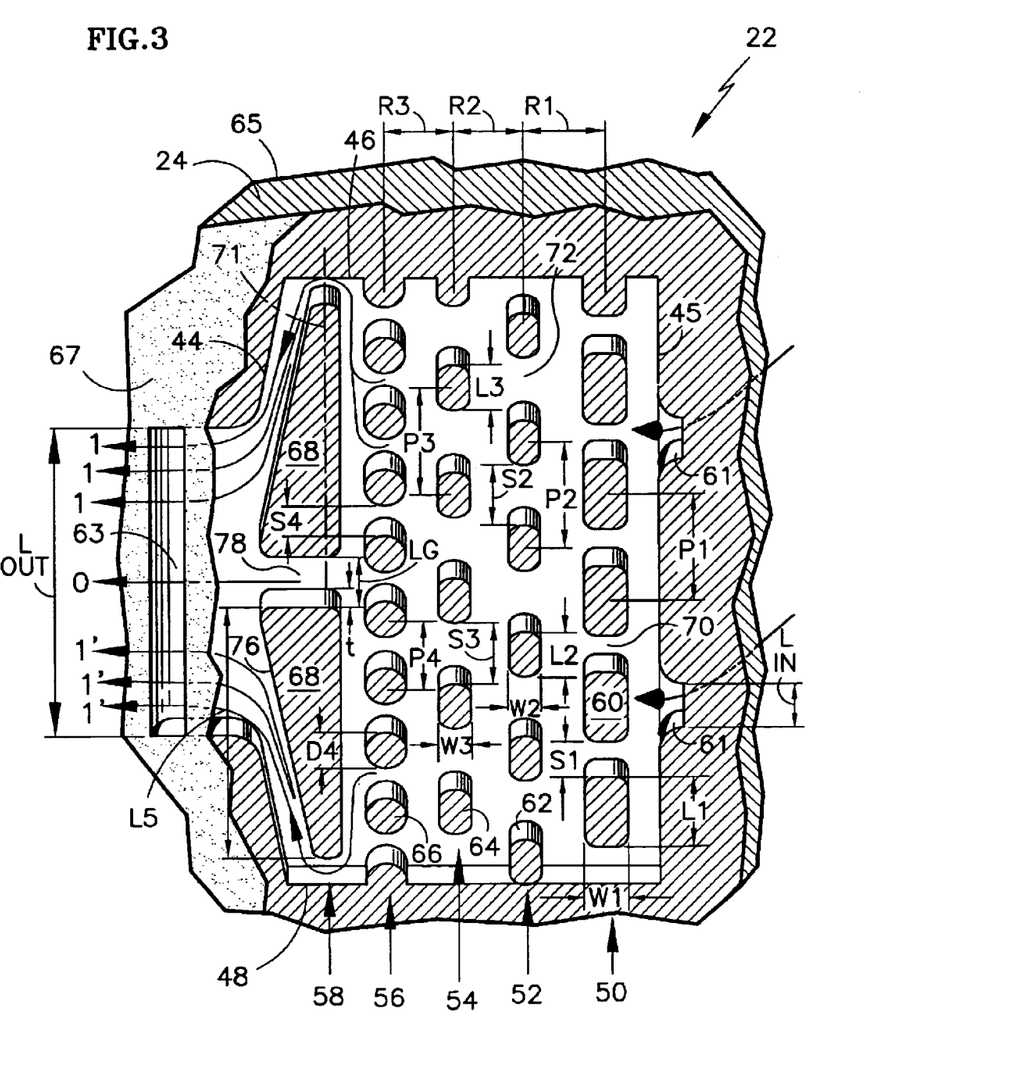
FIG. 3 is an enlarged diagrammatic view of an embodiment of the microcircuit cooling scheme of the present invention.
Figure 4:
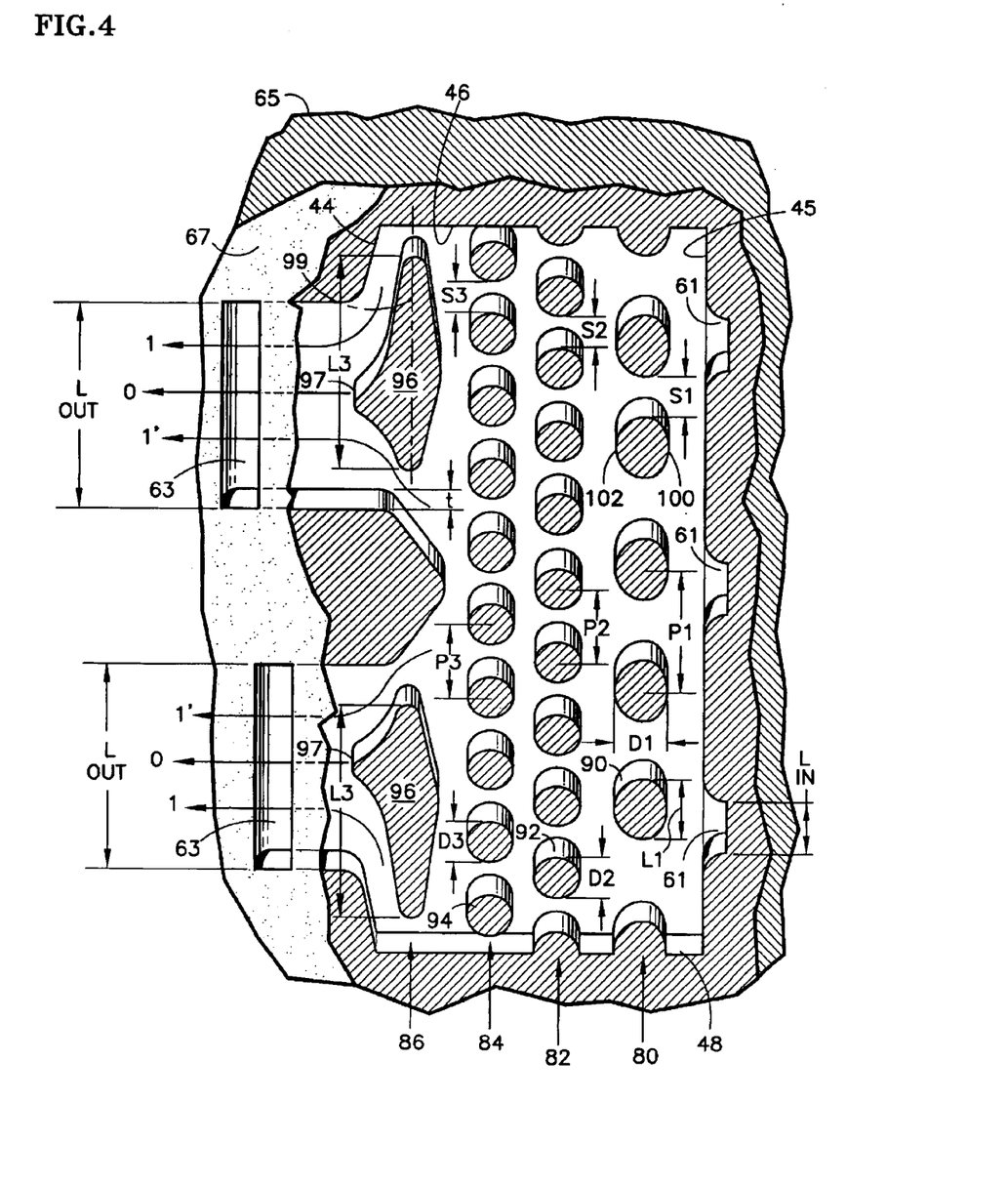
FIG. 4 is an enlarged diagrammatic view of an alternative embodiment of the microcircuit cooling scheme of the present invention.

Referring now to FIGS. 2 and 3, the microcircuit 22 will be furthered detailed. FIG. 3 is an enlarged view of one of the present invention microcircuit cooling scheme. Microcircuits offer tailorable, high convective efficiency cooling. Along with high convective efficiency, high film effectiveness is required for an advanced cooling configuration. FIG. 2 illustrates the microcircuit 22 of the present invention that are embedded in the wall 24 of the airfoil 26. Microcircuits may be machined or otherwise molded within a part. In a preferred embodiment, the microcircuits are formed of refractory metals forms and encapsulated in the part mold prior to casting. Several refractory metals including molybdenum (Mo) and Tungsten (W) have melting points that are in excess of typical casting temperatures of nickel based superalloys. These refractory metals can be produced in wrought thin sheet or forms in sizes necessary to make cooling channels characteristic of those found in turbine and combustor cooling designs. Specifically, such microcircuits may be fabricated into parts including, but not limited to, combustor liners, turbine vanes, turbine blades, turbine shrouds, vane endwalls, and airfoil edges. Preferably, such parts are formed in part or in whole of nickel based alloys or cobalt based alloys. Thin refractory metal sheets and foils possess enough ductility to allow bending and forming into complex shapes. The ductility yields a robust design capable of surviving a waxing/shelling cycle. After casting, the refractory metal can be removed, such as through chemical removal, thermal leeching, or oxidation methods, leaving behind a cavity forming the microcircuit 22 (FIGS. 3–4). It is noted that the cooling design of the present invention may also be manufactured using investment casting techniques with ceramic cores.

The cooling microcircuit 22 embodiments can occupy a wall surface area as great as 0.1 square inches. It is more common, however, for a microcircuit 22 to occupy a wall surface area less than 0.06 square inches, and the wall surface of preferred embodiments typically occupy a wall surface area closer to 0.05 square inches. In the exemplary embodiment, the thickness, t, of the microcircuit 22, as measured into the wall, is preferably of approximately about 0.012 inches to approximately about 0.025 inches, and most preferably about less than 0.017 inches.

The microcircuit 22 includes a forward end 44, an aft end 45, a first side 46, a second side 48, and a number of rows 50, 52, 54, 56 of posts or pedestals 60, 62, 64, 66, 68, respectively, that extend between a first wall portion (inner surface) 65 (FIG. 5) and a second wall portion (exterior surface) 67 (FIG. 5) of either of the sidewalls 28, 30. The microcircuit 22 extends widthwise between its forward end 44 and aft end 45, and lengthwise, or in the radial direction, between its first side 46 and second side 48. An inlet aperture 61 extends through the first wall portion 65 and is positioned proximate to the aft end 45 of the microcircuit 22 to provide a cooling airflow path from the cavity 32 of the airfoil 26 into the microcircuit 22. An exit aperture 63 extends through the second wall portion 67 proximate to the forward end 44 providing a cooling airflow path from the microcircuit 22 into the core gas path, G, outside the wall 24. The microcircuit 22 is typically oriented forward to aft along streamlines of the core gas flow, G, although orientation may vary to suit the application at hand. In the exemplary embodiment, there are two race track shaped inlet apertures 61 that extend lengthwise in the radial direction. In the exemplary embodiment, the exit aperture 63 is a slot extending lengthwise in the radial direction. The exemplary length, Lin, of the inlet apertures 61 is about 0.025 inches while the length, Lout, of the exit apertures 63 is about 0.100 inches.

The exemplary microcircuit 22, shown in FIG. 2, will now be further described with respect to the cooling design and the benefits achieved.

The row 50 has pedestals 60 formed substantially as elongated right rectangular cylinders. The pedestals 60 have a length L1 (measured parallel to the row) of about 0.040 inches, a width W1 (measured perpendicular to the row) of about 0.020 inches, a pitch, P1, of about 0.060 inches and a separation, S1, of about 0.020 inches. The pitch is defined as the on-center radial spacing between the respective pedestals within a row. The spacing is defined as the length of the pitch, P, minus the length of the diameter, D of the pedestal. The ratio of the pedestal dimension along the row, L, to the pitch, P, for the row defines a percentage of area along the particular row that is blocked by the pedestals, or referred to hereinafter as the restriction or blockage factor. For the identified dimensions above, the restriction or blockage factor is 67%.

The next row 52 has pedestals 62 also formed substantially as elongated right rectangular cylinders. The pedestals of this row have length, L2, of about 0.025 inches, a width W2 of about 0.015 inches, a pitch, P2, of about 0.0615 inches and separation, S2, of about 0.0365 inches. In the exemplary embodiment, L2, and W2 are both substantially smaller than L1 and W1. The pitch P2, however, is substantially the same as P1 and the stagger also completely out of phase so that the pedestals 62 are generally behind associated gap 70. A row pitch, R1, of about 0.0375 inches is between rows 50, 52. For the identified dimensions above, the restriction or blockage factor is 42%.

The next row 54 has pedestals 64 also formed substantially as elongated right rectangular cylinders. The pedestals 64 have length, L3, of about 0.025 inches, a width, W3, of about 0.015 inches, a pitch, P3, of about 0.0615 inches, and a spacing, S3, of about 0.0365 inches. In the exemplary embodiment, these are substantially the same as corresponding dimensions of the row 52 thereahead, but completely out of phase so that each pedestal 64 is immediately behind a gap 72. A row pitch, R2, of about 0.033 inches between the row 52 and the row 54 thereahead is like R1. For the identified dimensions above, the restriction or blockage factor is 42%.

The next row 56 has pedestals 66 formed substantially as right circular cylinders of diameter, D4 of about 0.0200 inches, pitch, P4, of about 0.038 inches and a spacing, S4, of about 0.018 inches. In the exemplary embodiment, D4 is smaller than the rectangular pedestal lengths. Additionally, the pitch P4 is smaller than pitches of the other rows and separation S4 is smaller than the separations of the rows other than the row 50. A row pitch, R3, of about 0.014 inches between the row 54 and the row 56 thereahead is, like R1 and R2. For the identified dimensions above, the restriction or blockage factor is 53%.

The next row 58 has two pedestals 68 each having a longitudinal axis 71 through the body of the pedestal such that the axis 71 extends in the radial direction. Thus, the pedestals 68 are elongated in shape in the radial direction and are aligned with the exit apertures 63 as shown in FIG. 3. The pedestals 68 are separated by a gap 78 that is centrally aligned with the exit aperture 63 in the forward end 44 of the microcircuit 22. The length, Lg, of the gap 78 in the radial direction is preferably no greater than about 0.015 inches. The pedestals 68 have generally a protrusion or apex 76 extending outward towards the exit aperture 63 to which it is aligned. In the exemplary embodiment, the length, L5, of the pedestals 68 along the radial direction is about 0.079 inches.

Thus, the rows 50, 52, 54, 56 and 58 have been described above and now the benefits achieved by the microcircuit 22 of FIG. 3 will now be described.

The first row 50 of pedestals 60 are spaced apart from one another in a pattern that controls local velocity and encourages lateral dispersion of cooling air flowing through the microcircuit 22. This dispersion results in the formation of wakes and increased heat pick up within the cooling circuit 22. The pedestals 60 are offset or staggered from the pedestals 62 of row 52. Likewise, the pedestals 64 of row 54 are offset from the pedestals 62 of row 52. The respective offsets are enough such that there is substantially no straight-line passage through the microcircuit 22. As the air passes through the pedestals 62 and 64, the wakes are reduced for a more uniform flow distribution. This result is achieved due to the relatively low restriction factor of the rows 52, 54 compared to the rows 50 and 56. Thus, the rows 52, 54 serve to minimize trailing wake turbulence and provide a progressive transition in wakes/turbulence within the cooling circuit 22. As the air passes through the next row 56, the air is metered thus increasing the velocity and, in turn, the heat transfer. It is noted that the row 50 has a greater restriction factor than the rows 52, 54, 56. Thus, air flow into the microcircuit 22 is distributed without excessive pressure drop and in a manner to maximize heat transfer.

The pedestals 68 minimize the wakes created by the turbulence of the air as it passes through the rows 50, 52, 54. Minimization of the wake turbulence avoids hot flow recirculation within the microcircuit 22 and facilitates heat pick-up. As the air flow is directed around the pedestals 68, it is uniformly distributed through the exit apertures 63. The use of slots for the exit apertures 63 is now appreciated. As the air exits the slots, a uniform film blanket of the wall 24 (FIG. 2), and more specifically the pressure and suction sidewalls 28, 30, (FIG. 2) respectively, is achieved. Thus, the pedestals 68 prevent flow streaking or discrete jets and through the exit aperture 63. Streaking is not advantageous as the corresponding air jets upon exiting through the exit aperture 63 will not provide uniform coverage of the metal resulting in possible hot spots of the wall 24. It is preferred for enhanced structural integrity of the airfoil 26 (FIG. 2) that the microcircuits 22 are disposed within the wall 24 such that the exit apertures 63, or slots, are not collinear.

Advantageously, the positioning of the pedestals 68, as described above, permits very good metering control of the air as it exits through the exit aperture 63. More specifically, the cooling air flows through the gap 78 and around the pedestals 68 close to the first and second sides 46, 48. Thus, as the flow is metered through row 56, part of the flow will pass through the gap 78 while the remainder of the air will pass around the pedestals 68. Also, in this way and as shown by the streamlines 0, 1, 1', of FIG. 3, the air flow through the exit aperture 63 is uniformly distributed. The center streamline 0 operates so as to not permit the streamlines 1 from crossing over to interfere with the streamlines 1' and visa versa. Thus, the orientation of the pedestals 68 permit flow straightening while ensuring accurate metering control with the result being an improved film cooling and effectiveness.

Referring now to FIG. 4, an alternate embodiment of the microcircuit 22 is shown. Like reference numbers and designations in the various drawings indicate like elements. The microcircuit 22 in this alternative embodiment has two exit apertures 63 and three inlet apertures 61. The exemplary embodiment microcircuit 22, shown in FIG. 4, will now be further described with respect to the cooling design and the benefits achieved. In the exemplary alternate embodiment, there are three race track shaped inlet apertures 61 that extend lengthwise in the radial direction and two exit apertures 63, preferably slots, also extending lengthwise in the radial direction. The exemplary length, Lin, of the inlet apertures 61 is about 0.025 inches while the length, Lout, of the exit apertures 63 is about 0.100 inches.

The microcircuit 22 has rows 80, 82, 84, 86 of pedestals or posts 90, 92, 94 and 96, respectively. Row 80 has pedestals 90 formed substantially as rounded triangular-like shaped cylinders in that there is a first side 100 that is flattened and generally perpendicular to the flow direction and then a generally rounded coverging side 102. The pedestals 90 have a major axis length, L1, of about 0.033 inches, a pitch, P1, of about 0.058 inches and a spacing, S1, of about 0.018 inches. The row 80 encourages lateral dispersion of the cooling air flowing into the microcircuit 22. For the identified dimensions above, the restriction or blockage factor is 52%.

The next two rows 82 and 84 have pedestals 92, 94, respectively, that are formed substantially as rounded right rectangular cylinders. Pedestals 92 have a diameter, D2, of about 0.020 inches, a spacing, S2, of about 0.0148 inches and a pitch, P2, of about 0.035 inches. For the identified dimensions above, the restriction or blockage factor is 57%. Pedestals 94 have a diameter, D3, of about 0.020 inches, a spacing, S3, of about 0.0148 inches, and a pitch P3, of about 0.035 inches. For the identified dimensions above, the restriction or blockage factor is 57%. Pedestals 92, 94 are generally offset or staggered relative to each other and serve to meter the air flow passing therebetween. The flow is metered by rows 82 and 84 to increase the flow velocity, local Reynolds Number and corresponding internal heat transfer coefficient. Thus, the concentration of pedestals 94 results in a higher restriction factor than the pedestals 90 in the row 80.

The last row 86 has two pedestals 96 where each pedestal 96 is aligned with one of the two respective exit apertures 63. The pedestals 96 have a longitudinal axis 99 that extends in the radial direction. Thus, the pedestals 96 are elongated in shape in the radial direction. Each pedestals 96 has generally a protrusion or apex 97 extending outward towards the respective exit aperture 63. Each of the pedestals 96 is generally centrally aligned with the respective exit aperture 63. In the exemplary embodiment, the longitudinal length, L3, of the pedestals 94 is about 0.100 inches.

Thus, the rows 80, 82, 84 and 86 have been described above and now the benefits achieved by the microcircuit 22 of FIG. 4 will now be described.

The first row 80 of pedestals 90 are spaced apart from another and have a shape as described hereinabove that controls local velocity and encourages lateral dispersion of cooling air flowing through the microcircuit 22. Also, the pedestals 90 minimize wake turbulence. The cooling air flow impinges onto the side 100 and is forced around the pedestals 90 by the side 102 thereby reducing the wake formed and avoiding hot spots behind the pedestals 90.

The pedestals 92, 94 of the next two rows 82, 84 are staggered with relation to each other and with respect to the pedestals 90 of the first row 80. Thus, there is substantially no straight line passage through the microcircuit 22. As the cooling air passes through their rows, the wakes are reduced for a more uniform flow distribution.

Advantageously, the positioning of the pedestals 96, as described above, permits very good metering control of the cooling air as it exits through the respective exit aperture 63. More specifically, as the cooling air passes through rows 82 and 84, the air impinges onto the pedestals 96 and is directed around the pedestals to exit through the corresponding exit aperture 63. Also, in this way and as shown by the streamlines, 0, 1, 1', the main streamline 0 provides for uniform flow distribution out through the exit aperture 63. That is to say, the streamlines 1 do not cross with the streamlines 1' and visa versa. The main streamline, 0, like that of the first embodiment shown in FIG. 3, is generally aligned with the center of the corresponding exit aperture 63. However, in the alternative embodiment, the pedestals 96 are aligned with the exit aperture 63 such that the majority of the length, L3, of the pedestals 96 are exposed to the exit aperture 63. As such, the streamlines, as they circumvent the pedestals, are free to exit through the exit aperture 63. Thus, the orientation of the pedestals 96 permit flow straightening while ensuring accurate metering control with the result being an improved film cooling and effectiveness.

Thus, the air flow is directed around the pedestals 96, it is uniformly distributed through the exit apertures 63. The use of slots for the exit apertures 63 is now appreciated. As the air exits the slots, a uniform film blanket of the wall 24 (FIG. 2), and more specifically the pressure and suction sidewalls 28, 30, (FIG. 2) respectively, is achieved. Thus, the pedestals 96 prevent flow streaking or discrete jets and through the exit apertures 63. Streaking is not advantageous as the corresponding air jets upon exiting through the exit aperture 63 will not provide uniform coverage of the metal resulting in possible hot spots of the wall 24. It is preferred for enhanced structural integrity of the airfoil 26 (FIG. 2) that the microcircuits 22 are disposed within the wall 24 such that the exit apertures 63, or slots, are not collinear. The pedestals 96 also serve to minimize the wakes created by the turbulence of the air as it passes through the rows 80, 82, 84. Minimization of the wakes avoids flow recirculation within the microcircuit 22 and facilitates heat pick-up.

Figures 5, 6, 7:
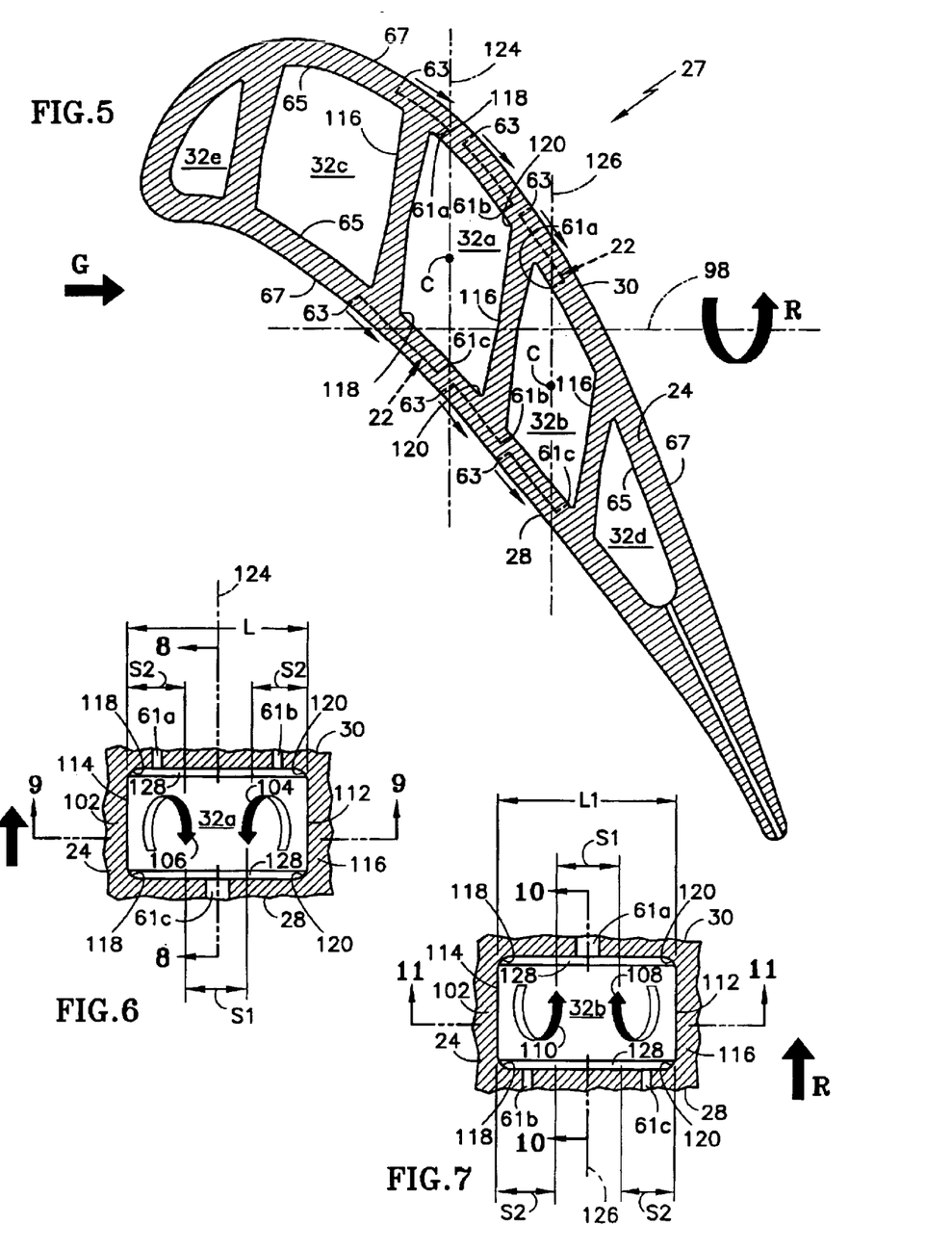
FIG. 5 is a cross-sectional view of the airfoil of FIG. 2 taken along 5—5 of FIG. 2.
FIG. 6 is a partial cross-sectional view of the airfoil blade depicted in FIG. 5 where the direction of the air flow through the cooling passage is radially outward and showing a feed trip and inlet apertures that feed the microcircuits in the wall of the airfoil.
FIG. 7 is a partial cross-sectional view of the airfoil blade depicted in FIG. 5 where the direction of the air flow through the cooling passage is radially inward and showing a feed trip and inlet apertures that feed the microcircuits in the wall of the airfoil.

Referring now to FIG. 5, additional features of the microcircuits 22 (FIGS. 3, 4) of the blade 27 will now be detailed. FIG. 5 shows a cross-sectional view of the blade 27 of FIG. 2 with multiple passages 32a–e. The passages 32a–c are separated by longitudinally extending partition walls or ribs 116 with each passage having first and second ends 118, 120 along the pressure and suction sidewalls. The blade 27 rotates about an axis of rotation 98. Passage 32a has a geometric center, C, through which a centerline or chordwise axis, 124, passes through such that centerline 124 is perpendicular or normal to the axis of rotation 98. Similarly, passage 32b has a geometric center, C, through which a centerline or chordwise axis, 126, passes through such that centerline 126 is perpendicular or normal to the axis of rotation 98. It is noted that shape of the passage 32a–e and in particular, 32a–b, are for illustrative purposes. Further, and for later reference, it is noted that the centerlines 124, 126 extend through the pressure and suction sidewalls 28, 30. An arrow, R, indicates the direction of rotation. It is also noted that FIG. 5 illustrates representative microcircuits 22 embedded within the pressure and suction sidewalls 28. 30 and the corresponding inlet apertures 61a–c which will be further explained detailed below.

During operation of the gas turbine engine, the cooling air flowing inside passages 32a–e is subjected to a rotational force. The interaction of the radial flow through passages 32a–e and this rotation results in what is known as a Coriolis force which creates internal flow circulation in passages 32a–e. Basically, the Coriolis force is proportional to the vector cross product of the velocity vector of the coolant flowing through the passage and the angular velocity vector of the rotating blade. Incidentally, it will be appreciated that the cooling air flow through the passages 32a–e may be either radially inward or outward.

Referring now to FIGS. 6 and 7, the placement of the microcircuits 22 and more particularly the inlet apertures 61 of both embodiments as shown in FIGS. 3 and 4, within the wall 24 of the airfoil 26 (FIG. 2), will now be described. FIG. 6 is a partial cross-sectional view of the airfoil 26 depicted in FIG. 2 showing a feed trip (trip) 128 and inlet apertures 61a–c that feed the microcircuits. FIG. 7 is a partial cross-sectional view of the airfoil 26 depicted in FIG. 2 showing the feed trip 128 and inlet apertures 61a–c that feed the microcircuits.

As seen in FIGS. 6 and 7, the direction of the flow circulation is dependent upon the direction of the radial flow (i.e., whether it is radially outward or radially inward). For illustrative purposes, the cooling air flow in the passage 32a is in a radially outward direction with respect to the centerline 124 (i.e., toward the tip 42, FIG. 2); whereas the cooling air flow through the passage 32b is in a radially inward direction with respect to the centerline 126 (i.e., away from the tip 42). FIG. 6 depicts schematically a pair of counter-rotating circulations 104 and 106 created by the Coriolis force in the passage 32a which moves the fluid from the suction sidewall 30 to the pressure sidewall 28 and back to complete the circulation. In contrast, FIG. 7 depicts schematically a pair of counter-rotating circulations 108 and 110 created by the Coriolis force in the passage 32b which moves the fluid from the pressure sidewall 28 to the suction sidewall 30 and back to complete the circulation. Each of the passages also include opposing inner walls 112, 114 that join together with the sidewalls 28, 30 so as to form the passages 32a–e. Inner walls 112, 114 are part of the ribs 116 that partition the cavity 32 (FIG. 2).

In the exemplary embodiment, there will be a plurality of microcircuits 22 (FIG. 5) disposed within the pressure and suction sidewalls, 28, 30, respectively. Further, the inlet apertures 61 of each of the respective microcircuits 22 are positioned codirectionally with respect to the counter-rotating circulations (vortex pair) 104 and 106, 108 and 110 caused by the Coriolis forces on the cooling air flowing through the respective passages 32a–b. In this way, the counter-rotating circulations 104 and 106, 108 and 110, will be employed to assist in the ingestion of the cooling air into the inlet apertures 61 and into the microcircuit 22. It is understood and within the scope of this invention that at very high Rotational Number, Ro, of approximately about greater than 0.25, there may be two vortex pairs within the rotating passages. As stated above and further described below, the inlets are to be positioned in similar manner as described above and in further detail below to take advantage of the Coriolis forces on the sidewalls 28, 30. The Rotational Number is known in the art. It is noted that the placement of the inlet apertures 61 with respect to the pressure and suction sidewalls 28, 30 will depend on the direction of the cooling air (i.e., radially inward or outward) within the internal passage that the respective inlet aperture is in flow communication with. This feature of the present invention will be further detailed below.

In the exemplary embodiment where the cooling flow is radially outward, as provided in the cooling passage 32a (FIG. 6), the inlet apertures 61 of the respective microcircuits 22 on the suction sidewall 30 are positioned to correspond to an area proximate and adjacent to the ribs 116 and away from a middle portion of the passage 32a while on the pressure sidewall 28, the inlet apertures 61 of the respective microcircuits 22 are positioned proximate to about the centerline 124 of the passage 32a. These positions for the inlet apertures 61, relative to the pressure and suction sidewalls 28, 30, will thus be codirectional with the Coriolis forces therein.

In like manner and for similar reasoning as described above, in the exemplary embodiment where the cooling flow is radially inward as provided in cooling passage 32b (FIG. 7), the inlet apertures 61 of the respective microcircuits 22 on the suction sidewall 30 are positioned proximate to about the centerline 126 of the passage 32b while on the pressure sidewall 28, the inlet apertures 61 of the respective microcircuits 22 are positioned to correspond to an area proximate and adjacent to the ribs 116 and away from a middle portion of the passage 32b. These positions for the inlet apertures 61, relative to the pressure and suction sidewalls 28, 30, will thus be codirectional with the Coriolis force therein. From the above description, attention is drawn to the fact that due to the orientation of the microcircuits 22 within the respective pressure and suction sidewalls, as represented in FIG. 2, each of the inlet apertures 61a–c for passage 32a and b are part of different microcircuits.

As shown in FIGS. 6 and 7, the passages 32a–b, have a length L and L1, respectively, extending between the first end 118 and the opposing second end 120. In the exemplary embodiment when the cooling flow is radially outward, as shown in passage 32a, the inlet apertures 61 of the microcircuits 22 within the pressure sidewall 28 that feed the passage 32a are positioned within a span, S1, along the pressure sidewall 28 of about 10% on either side of the intersection of the centerline 124 with the inner surface of the pressure sidewall 28. This corresponds to a distance of about 20% of the length, L. Further, the inlet apertures 61 of the microcircuits 22 within the suction sidewall 30 that feed the passage 32a are positioned along the pressure sidewall such that the inlet apertures 61 of each microcircuit are within a span, S2, of about 40% from the first end 118 and within a span, S2, of about 40% of the second end 120. The respective spans along the pressure sidewall 28, as measured from each of the ends 118, 120, correspond to a distance of about 40% of the length, L.

Further in the exemplary embodiment when the cooling flow is radially inward as shown in passage 32b, the inlet apertures 61 of the microcircuits 22 within the suction sidewall 30 that feed the passage 32b are positioned within a span, S1, along the suction sidewall 30 of about 10% on either side of the intersection of the centerline 126 with the inner surface of the suction sidewall 30. This corresponds to a distance of about 20% of the length, L1. Further, the inlet apertures 61 of the microcircuits 22 within the pressure sidewall 28 that feed the passage 32b are positioned along the pressure sidewall 28 such that the inlet apertures 61 of each microcircuit are within a span, S2, of about 40% from the first end 118 and within a span, S2, of about 40% from the second end 120. The respective spans along the pressure sidewall 28, as measured from each of the ends 118, 120, correspond to a distance of about 40% of the length, L1.

It is further noted and within the scope of the present invention that the centerlines 124, 126 of the passages 32a–b, respectively, are definable for any shape internal passage within a rotating airfoil. Thus, it follows that the placement of the inlet apertures 61, as recited hereinabove with respect to the centerlines 124, 126, as provided for in the present invention and shown in FIGS. 6 and 7, can be implemented and utilized in connection with many alternative internal passage configurations of varying shape that rotate and have an internal fluid, such as air, flowing therebetween. Attention is also drawn to the fact that the intersection of the centerlines 124, 126 with the pressure and suctions sidewalls 28, 30 for any internal passage will vary with the shape and configuration of the passage.

Figure 8:
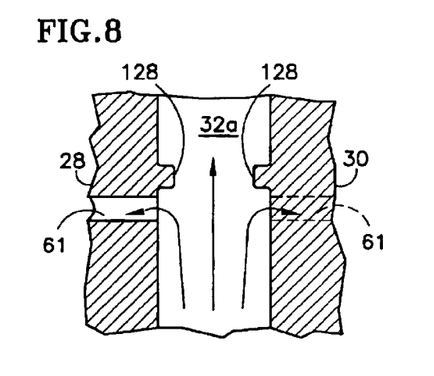
FIG. 8 is a partial cross-sectional view of the cooling passage in FIG. 6 taken along 8—8 of FIG. 6 showing the feed trip in relation to the inlet apertures.
Figure 9:
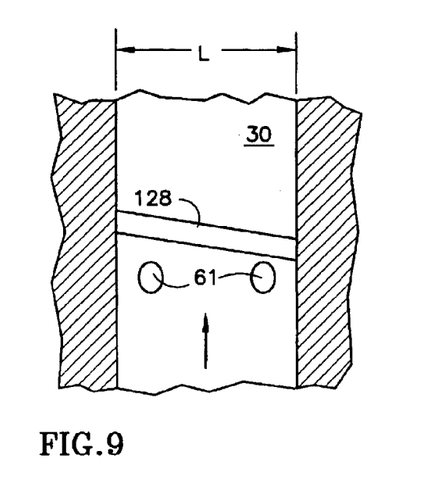
FIG. 9 is a partial cross-sectional view of the cooling passage in FIG. 6 taken along 9—9 of FIG. 6 where the feed trip and inlet apertures are shown on the suction sidewall of the airfoil.

Referring now to FIGS. 8 and 9, feed trips or turbulators 128 are shown radially adjacent to the inlet apertures 61 in the passage 32a, 32b, respectively. FIG. 8 is a partial cross-sectional view of the passage 32a taken along 8—8 of FIG. 6 showing the feed trip 128 in relation to the inlet apertures 61. FIG. 9 is a partial cross-sectional view of the passage 32a taken along 9—9 of FIG. 6 where the feed trip 128 and inlet apertures 61 are shown on the suction sidewall 30.

Figure 10:
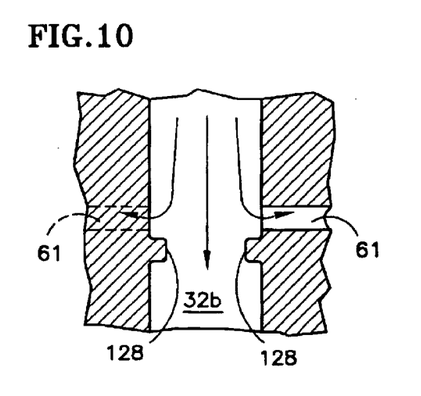
FIG. 10 is a partial cross-sectional view of the cooling passage in FIG. 7 taken along 10—10 of FIG. 7 showing the feed trip in relation to the inlet apertures.
Figure 11:
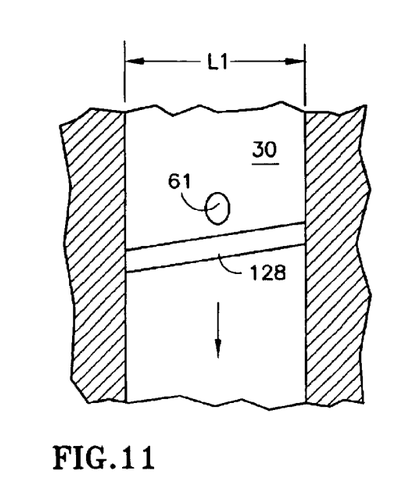
FIG. 11 is a partial cross-sectional view of the cooling passage in FIG. 7 taken along 11—11 of FIG. 7 where the feed trip and inlet apertures are shown on the suction sidewall of the airfoil.

Similarly, in FIGS. 10 and 11, feed trips or turbulators 128 are shown radially adjacent to the inlet apertures 61 in the passage 32b. FIG. 10 is a partial cross-sectional view of the passage 32b in FIG. 7 taken along 10—10 of FIG. 7 showing the feed trip 128 in relation to the inlet apertures 61. FIG. 11 is a partial cross-sectional view of the passage 32b in FIG. 7 taken along 11—11 of FIG. 7 where the feed trip 128 and inlet apertures 61 are shown on the suction sidewall 30.

The trips 128 are positioned downstream of the inlet apertures 61 with respect to the direction of the cooling flow within the passages 32a–b. In this way, the trips 128 impede the cooling flow within the passages 32a–b and facilitate entry of the cooling air into the microcircuits 22. Although the trips in FIGS. 8, 9, 10 and 11 are shown as slanted with a rectangular cross sections, the trips of the present invention are not limited to such cross-sections [e.g. semi-oval or hemisphereical] may be slanted towards the trailing or leading edges and may be curved or straight.

When the microcircuits 22 are positioned within the suction sidewall 30 as described hereinabove, the inlet apertures 61 will be perpendicular to the axis of rotation 98 and, as such will be aligned with the flow of the Coriolis forces. Similarly, when the microcircuits 22 are positioned within the pressure sidewall 28 as described hereinabove, the inlet apertures 61 will be perpendicular to the axis of rotation 98 and, as such, will be aligned with the flow of the Coriolis forces. It is further noted that the placement of the inlet apertures 61 as described hereinabove may be advantageously employed with a variety of microcircuit cooling designs embedded in a wall to be cooled and having an inlet and an outlet. That is to say, the present invention placement of the inlet apertures 61 is not limited to the microcircuit cooling designs as provided in FIGS. 3 and 4. It is also noted that although buoyancy forces, defined as the [Grashoff Number/(Reynolds Number squared)], may operate within the passages to reduce the magnitude of the Coriolis forces, the above detailed placement of the inlet apertures 61 will provide for the exemplary position of the inlet apertures 61 relative to the passages. The rotational Grashoff Number and Reynolds Number are known in the art.

Figure 12:
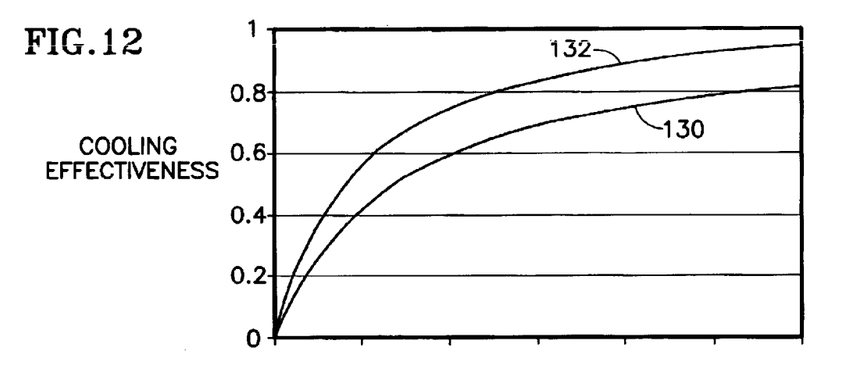
FIG. 12 is a plot of cooling effectiveness vs. the required blade cooling flow for the airfoil of the present invention as shown in FIG. 4 and a conventionally cooled airfoil as shown in the following FIG. 13.

Referring now to FIGS. 2, 12 and 13, the benefits of the present invention illustrated and described herein will now be detailed. FIG. 13 is a prior art conventionally cooled airfoil. FIG. 12 is a plot of required blade cooling flow vs. cooling effectiveness for the present cooling scheme as described above and the conventional prior art blade configuration shown in FIG. 13. Curve 130 represents the cooling effectiveness for the prior art blade configuration shown in FIG. 13. Curve 132 represents the cooling effectiveness for the embodiment of the present invention disclosed herein in FIG. 4. A similar cooling effectiveness and the corresponding benefits, as that shown in curve 132, will be achieved with the embodiment in FIG. 3.

The cooling effectiveness ratio is defined as the ratio of the temperature difference of the relative hot combustion gases and the bulk metal temperature to the temperature difference between the relative hot combustion gases and the coolant (cooling air) defined as follows:

$$\Phi = [T_{gas} - T_{metal}]/[T_{gas} - T_{coolant}]$$

where:

$T_{gas}$=temperature of the gas flowing exterior to the airfoil;

$T_{coolant}$=temperature of the cooling air; and $T_{metal}$=bulk metal temperature of the airfoil.

Preferably, turbine engineers and designers try to design for a cooling effectiveness ratio in excess of about 70% because the cooler the metal temperature the better the overall durability of the blade 27. This is achieved in the present invention in two ways. First, film cooling is employed to reduce the temperature of the hot combustion gases. The temperature is reduced due to the mixing of the cooling air as it ejects from the exit apertures 63 into the hot combustion gas flow. But, it is not desirable to rely on this method completely since, as addressed hereinabove, the more cooling air taken away from the compressor 14 (FIG. 1), the less work the compressor 14 (FIG. 1) can produce. So, and as described above, the present invention employs a novel approach to internally convectively cool the wall 24 to achieve a desirable cooling effectiveness ratio. It is noted that traditional film cooling of airfoils does not employ this method to a high and reliable degree of efficiency. The measure of convective cooling efficiency is a function of the heat pick up of the cooling air as it travels within the microcircuit 22, as follows:

$$\eta_c = [T_{coolant,out} - T_{coolant,in}]/[T_{metal} - T_{coolant,in}]$$

where:

$T_{coolant,out}$=temperature of the cooling air exiting the outlets;

$T_{coolant,in}$=temperature of the cooling air entering the inlets; and $T_{metal}$=bulk metal temperature of the airfoil.

In the equation above, turbine engineers and designers seek a design with a high heat pick up thus cooling the wall 24 of the airfoil 26. The present invention, as shown in curve 132 of FIG. 12, achieves this increased heat pick up in a number of ways. First, the pedestals 60, 62, 64, 66, as shown in FIG. 3, and 90, 92, 94, shown in FIG. 4, are turbulence promoters within the microcircuit 22. Second, the pedestals also serve to increase the surface area thereby enhancing the conductive heat transfer path. Third, the pedestals disperse the flow throughout the microcircuit 22. Fourth, the metering rows in both embodiments shown in FIGS. 3 and 4, meter the flow to increase heat transfer pick-up within the microcircuit 22.

It is understood by those skilled in the art and within the scope of this invention, that the arrangement of the pedestals and the shapes and size of the pedestals can all be varied to achieve the desired heat transfer properties for a given airfoil design.

Once the cooling air is ejected from the microcircuit, 22, it can partially mix into the stream of hot combustion gases, G, and because of its own momentum, it can flow over the sidewalls 28, 30. Thus, the ejected cooling air film cools the wall 24, and more particularly, the pressure and suction sidewalls 28, 30, by providing a film curtain that protects the blade 27 from the hot combustion gases, G.

Thus, the present invention provides a cooling system that employs a novel approach to film and convectively cool an airfoil. In particular, this combination provides an advantage over the prior art cooling schemes in that, to achieve the same metal temperature at the wall 24, less cool compressor air is required to cool the wall 24. Less compressor bleed flow results in the additional advantage of providing an increase in turbine efficiency. As compared to the prior art, the present invention provides a novel microcircuit cooling design to synergistically improve performance and extend blade life. The microcircuit 22 of the present invention provides an improved means to film cool the airfoil 26. Thus, a blade 27 employing the beneficial cooling design of the present invention will not only have a longer service life but also improve overall turbine efficiency.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

I claim:

1. A turbine rotor blade comprising:
   an external wall, said external wall includes an inner surface;
   an internal cavity into which cooling air is flowable;
   a first cooling circuit embedded within said wall, said first cooling circuit includes:
      a first inlet, said first inlet connects said first cooling circuit with said cavity and provides a cooling air flow path into said first cooling circuit; and
      an exit aperture, said exit aperture provides a cooling air flow path out of said first cooling circuit, said first cooling circuit configured to increase the temperature of the cooling air as it travels from said inlet to said exit aperture;
   a second cooling circuit embedded within said wall, said second cooling circuit includes:
      a first inlet, said first inlet of said second cooling circuit connects said second cooling circuit with said cavity and provides a cooling air flow path into said second cooling circuit; and
      an exit aperture, said exit aperture of said second cooling circuit provides a cooling air flow path out of said second cooling circuit, said second cooling circuit configured to increase the temperature of the cooling air as it travels from said inlet of said second cooling circuit to said exit aperture of said second cooling circuit; and
   a third cooling circuit embedded within said wall, said third cooling circuit includes:
      a first inlet, said first inlet of said third cooling circuit connects said third cooling circuit with said cavity and provides a cooling air flow path into said third cooling circuit; and
      an exit aperture, said exit aperture of said third cooling circuit provides a cooling air flow path out of said third cooling circuit, said third cooling circuit configured to increase the temperature of the cooling air as it travels from said inlet of said third cooling circuit to said exit aperture of said third cooling circuit;
   wherein said first inlets are aligned with the direction of counter-rotating flow circulations experienced by said inner surface of said wall of said cavity caused by Coriolis forces on the cooling air flowing inside said cavity.

2. The blade of claim 1, wherein said first, second and third cooling circuits include a plurality of pedestals spaced apart from one another and extending between first and second wall portions of said wall to define a pathway to turbulate the cooling air passing therebetween.

3. A turbine blade comprising:
   first and second sidewalls extending longitudinally in span from root to tip, and extending in chord between leading and trailing edges, said sidewalls being spaced laterally apart between said leading and trailing edges, and joined together by chordally spaced apart partitions extending longitudinally between said root and tip to define an internal cavity into which cooling air is flowable;
   a first cooling circuit embedded within said first sidewall, said first cooling circuit includes:
      a first inlet, said first inlet connects said first cooling circuit with said cavity and provides a cooling air flow path into said first cooling circuit; and
      an exit aperture, said exit aperture provides a cooling air flow path out of said first cooling circuit, said first cooling circuit configured to increase the temperature of the cooling air as it travels from said inlet to said exit aperture;

a second cooling circuit embedded within said second sidewall, said second cooling circuit includes:
  a first inlet, said first inlet of said second cooling circuit connects said second cooling circuit with said cavity and provides a cooling air flow path into said second cooling circuit; and
  an exit aperture, said exit aperture of said second cooling circuit provides a cooling air flow path out of said second cooling circuit, said second cooling circuit configured to increase the temperature of the cooling air as it travels from said inlet of said second cooling circuit to said exit aperture of said second cooling circuit; and
a third cooling circuit embedded within said second sidewall, said third cooling circuit includes:
  a first inlet, said first inlet of said third cooling circuit connects said third cooling circuit with said cavity and provides a cooling air flow path into said third cooling circuit; and
  an exit aperture, said exit aperture of said third cooling circuit provides a cooling air flow path out of said third cooling circuit, said third cooling circuit configured to increase the temperature of the cooling air as it travels from said inlet of said third cooling circuit to said exit aperture of said third cooling circuit;
wherein said first inlets are aligned with the direction of counter-rotating flow circulations experienced by inner surfaces of said sidewalls of said cavity caused by Coriolis forces on the cooling air flowing inside said cavity.

4. The blade of claim 3, wherein said first sidewall is a generally concave, pressure sidewall, and said second sidewall is a generally convex, suction sidewall and said first inlet of said first cooling circuit is positioned within a span along said pressure sidewall of about 20% on either side of a centerline that traverses said cavity, said centerline is perpendicular to the axis of rotation of the blade and extends through said sidewalls, and
  wherein said suction sidewall includes a first end and an opposing second end, said first inlet of said second cooling circuit is positioned within a span along said suction sidewall of about 40% from said first end of said suction sidewall and said first inlet of said third cooling circuit is positioned within a span along said suction sidewall of about 40% span from said second end of said suction sidewall;
  when the cooling air flow is radially outward in said cavity.

5. The blade of claim 3, wherein said first sidewall is a generally convex, suction sidewall, and said second sidewall is a generally concave, pressure sidewall and said first inlet of said first cooling circuit is positioned within a span along said suction sidewall of about 20% on either side of a centerline that traverses said cavity, said centerline is perpendicular to the axis of rotation of the blade and extends through said sidewalls, and
  wherein said pressure sidewall includes a first end and an opposing second end, said first inlet of said second cooling circuit is positioned within a span along said pressure sidewall of about 40% from said first end of said pressure sidewall and said first inlet of said third cooling circuit is positioned within a span along said pressure sidewall of about 40% span from said second end of said pressure sidewall;
  when the cooling air flow is radially inward in said cavity.

6. The blade of claim 3, wherein the blade is fabricated from a metal selected from the group consisting of nickel based alloys and cobalt based alloys.

7. The blade of claim 4, wherein said exit aperture of said first cooling circuit is a film cooling slot, said film cooling slot radially extends through said pressure sidewall and discharges said cooling air from therefrom, and
  wherein said exit apertures of said second and third cooling circuits are film cooling slots, said film cooling slots of said second and third cooling circuits radially extend through said suction sidewall, said film cooling slot of said second cooling circuit discharges the cooling air therefrom and said film cooling slot of said third cooling circuit discharges the cooling air therefrom.

8. The blade of claim 7, wherein said film cooling slots of said second and third cooling circuits are radially staggered.

9. The blade of claim 5, wherein said exit aperture of said first cooling circuit is a film cooling slot, said film cooling slot radially extends through said suction sidewall and discharges said cooling air from therefrom, and
  wherein said exit apertures of said second and third cooling circuits are film cooling slots, said film cooling slots of said second and third cooling circuits radially extend through said pressure sidewall, said film cooling slot of said second cooling circuit discharges the cooling air therefrom and said film cooling slot of said third cooling circuit discharges the cooling air therefrom.

10. The blade of claim 9, wherein said film cooling slots of said second and third cooling circuits are radially staggered.

11. The blade of claim 5, further including a first turbulator positioned on said inner surface of said pressure sidewall adjacent and upstream of said first inlets of said second and third cooling circuits, and a second turbulator positioned on said inner surface of said suction sidewall adjacent and upstream of said first inlet of said first cooling circuit.

12. The blade of claim 4, further including a first turbulator positioned on said inner surface of said suction sidewall adjacent and upstream of said first inlet of said first cooling circuit, and a second turbulator positioned on said inner surface of said pressure sidewall adjacent and upstream of said first inlets of said second and third cooling circuits.

13. The blade of claim 3, wherein said first cooling circuit includes a second inlet, said first and second inlets of said first cooling circuit radially spaced apart.

14. The blade of claim 3, wherein said first cooling circuit occupies a wall surface area no greater than about 0.06 square inches, said second cooling circuit occupies a wall surface area no greater than about 0.06 square inches, and said third cooling circuit occupies a wall surface area no greater than about 0.06 square inches.

15. The blade of claim 13, wherein said first and second inlets are race track shaped whose length in the radial direction is greater than its width transverse to such direction.

16. A method for placing inlets of cooling circuits in an exterior wall of a turbine blade to facilitate ingestion of cooling air into said cooling circuits, said wall having an inner surface and said blade having an internal cavity into which cooling air is flowable from an end of said cavity, the cavity in flow communication with the inlets, said method comprising:
  determining the flow direction of cooling air within said cavity;
  taking into account Coriolis flow effects in the cooling air caused by rotation of the blade; and placing said inlets aligned with the direction of counter-rotating flow circulations experienced by said inner surface of said wall caused by Coriolis forces on the cooling air flowing inside said cavity.

17. The method of claim 16, further including the steps of:
placing a turbulator on said inner surface of said wall adjacent and upstream of one of said inlets.

18. The method of claim 16, wherein said wall includes first and second sidewalls extending longitudinally in span from root to tip, and extending in chord between leading and trailing edges, said sidewalls being spaced laterally apart between said leading and trailing edges, and joined together by chordally spaced apart partitions extending longitudinally between said root and tip to define said internal cavity, and wherein said first sidewall is a generally concave, pressure sidewall, and said second sidewall is a generally convex, suction sidewall and one of said inlets of a respective one of said cooling circuits is positioned within a span along said pressure sidewall of about 20% on either side of a centerline that traverses said cavity, said centerline is perpendicular to the axis of rotation of the blade and extends through said sidewalls, and wherein said suction sidewall includes a first end and an opposing second end, and one of said inlets of a respective one of said cooling circuits is positioned within a span along said suction sidewall of about 40% from said first end of said suction sidewall and one of said inlets of a respective one of said cooling circuits is positioned within a span along said suction sidewall of about 40% span from said second end of said suction sidewall;

when the cooling air flow is radially outward in said cavity.

19. The method of claim 16, wherein said wall includes first and second sidewalls extending longitudinally in span from root to tip, and extending in chord between leading and trailing edges, said sidewalls being spaced laterally apart between said leading and trailing edges, and joined together by chordally spaced apart partitions extending longitudinally between said root and tip to define said internal cavity, and wherein said first sidewall is a generally convex, suction sidewall, and said second sidewall is a generally concave, pressure sidewall and one of said inlets of a respective one of said cooling circuits is positioned within a span along said suction sidewall of about 20% on either side of a centerline that traverses said cavity, said centerline is perpendicular to the axis of rotation of the blade and extends through said sidewalls, and wherein said pressure sidewall includes a first end and an opposing second end, and one of said inlets of a respective one of said cooling circuits is positioned within a span along said pressure sidewall of about 40% from said first end of said pressure sidewall and one of said inlets of a respective one of said cooling circuits is positioned within a span along said pressure sidewall of about 40% span from said second end of said pressure sidewall;

when the cooling air flow is radially inward in said cavity.

20. The method of claim 16, wherein said blade is fabricated from a metal selected from the group consisting of nickel based alloys and cobalt based alloys.

21. The method of claim 16, wherein one of said cooling circuits occupies a wall surface area no greater than about 0.06 square inches.

22. The method of claim 16, wherein said inlets are race track shaped whose length in the radial direction is greater than its width transverse to such direction.

* * * * *